(12) United States Patent
Park

(10) Patent No.: US 9,535,424 B2
(45) Date of Patent: Jan. 3, 2017

(54) ADJUSTABLE SPOILER FOR VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Yong Min Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/863,442

(22) Filed: Sep. 23, 2015

(65) Prior Publication Data
US 2016/0129951 A1    May 12, 2016

(30) Foreign Application Priority Data
Nov. 6, 2014 (KR) .......................... 10-2014-0153634

(51) Int. Cl.
*B60J 9/00* (2006.01)
*G05D 3/20* (2006.01)
*B62D 35/00* (2006.01)

(52) U.S. Cl.
CPC .............. *G05D 3/20* (2013.01); *B62D 35/007* (2013.01)

(58) Field of Classification Search
CPC ....... B62D 35/007; B62D 37/02; B60R 9/055; G05D 1/0623; B64C 9/16; B60J 7/0573; B60J 7/047; B60J 7/0435; Y10S 180/903
USPC .......... 296/180.5, 180.1; 244/213, 214, 215; 701/4; 180/903
See application file for complete search history.

(56) References Cited

U.S. PATENT DOCUMENTS

| 4,444,368 | A | * | 4/1984 | Andrews | .................. | B64C 9/16 |
| | | | | | | 244/212 |
| 4,629,240 | A | * | 12/1986 | Dornier | ................ | B62D 35/007 |
| | | | | | | 180/903 |
| 4,674,788 | A | * | 6/1987 | Ohmura | ............... | B62D 35/007 |
| | | | | | | 296/180.5 |
| 4,854,635 | A | * | 8/1989 | Durm | .................. | B62D 35/007 |
| | | | | | | 296/180.1 |
| 4,887,681 | A | * | 12/1989 | Durm | ..................... | B60K 11/08 |
| | | | | | | 180/68.1 |
| 4,889,382 | A | * | 12/1989 | Burst | ....................... | F01P 11/10 |
| | | | | | | 180/68.1 |
| 4,925,236 | A | * | 5/1990 | Itoh | ..................... | B62D 35/008 |
| | | | | | | 296/180.1 |
| 5,074,612 | A | * | 12/1991 | Liese | .................. | B62D 35/007 |
| | | | | | | 296/106 |
| 5,141,281 | A | * | 8/1992 | Eger | .................... | B62D 35/007 |
| | | | | | | 296/180.5 |

(Continued)

FOREIGN PATENT DOCUMENTS

JP    2006-335218 A    12/2006
KR    1998-028866    6/1999

(Continued)

*Primary Examiner* — Kiran B Patel
(74) *Attorney, Agent, or Firm* — McDermott Will & Emery LLP

(57) ABSTRACT

An adjustable spoiler for a vehicle includes a pressure sensor sensing a pressure applied to an upper side of a spoiler and generating a current signal in proportion to the pressure. An electronic control unit (ECU) is configured to control an angle of a spoiler according to the current signal from the pressure sensor. The spoiler is mounted on the upper side of a vehicle body.

8 Claims, 4 Drawing Sheets

(56) References Cited

U.S. PATENT DOCUMENTS

| | | | | |
|---|---|---|---|---|
| 5,454,619 | A * | 10/1995 | Haraway, Jr. | B62D 37/02 180/903 |
| 5,923,245 | A * | 7/1999 | Klatt | B60Q 1/302 180/68.3 |
| 6,139,090 | A * | 10/2000 | Stidd | B62D 35/007 180/903 |
| 6,189,837 | B1 * | 2/2001 | Matthews | B64C 9/32 244/213 |
| 6,193,302 | B1 * | 2/2001 | Won | B62D 35/007 180/903 |
| 6,206,444 | B1 * | 3/2001 | Casey | B60P 1/26 296/180.1 |
| 6,378,932 | B1 * | 4/2002 | Fasel | B62D 35/001 180/903 |
| 6,520,564 | B1 * | 2/2003 | Liang | B62D 35/00 180/903 |
| 6,575,522 | B2 * | 6/2003 | Borghi | B62D 35/005 296/180.1 |
| 7,213,870 | B1 * | 5/2007 | Williams | B62D 35/007 296/180.3 |
| 7,264,300 | B2 * | 9/2007 | Hillgaertner | B62D 35/007 296/180.5 |
| 7,665,796 | B2 * | 2/2010 | Wegener | B62D 35/007 180/903 |
| 7,770,962 | B1 * | 8/2010 | Maxwell | B62D 35/007 296/180.5 |
| 8,177,288 | B2 * | 5/2012 | Molnar | B62D 35/007 296/180.5 |
| 8,678,475 | B2 * | 3/2014 | Goenueldinc | B62D 35/007 296/180.5 |
| 2002/0021022 | A1 * | 2/2002 | Erdelitsch | B62D 35/007 296/180.1 |
| 2002/0067049 | A1 * | 6/2002 | Pettey | B62D 35/007 296/180.5 |
| 2007/0145776 | A1 * | 6/2007 | Grave | B62D 35/007 296/180.5 |
| 2008/0179915 | A1 * | 7/2008 | Wegener | B62D 35/007 296/180.1 |
| 2008/0272615 | A1 | 11/2008 | McKnight et al. | |
| 2013/0221701 | A1 * | 8/2013 | De Luca | B62D 37/02 296/180.5 |

FOREIGN PATENT DOCUMENTS

| | | |
|---|---|---|
| KR | 2010-0064083 A | 6/2010 |
| KR | 10-2011-0106694 | 5/2012 |
| KR | 10-1351567 B1 | 1/2014 |
| KR | 10-1438936 B1 | 9/2014 |

* cited by examiner (A) SIMPLE ON/OFF CONTROL

-- RELATED ART --

(B) CONTROL MODE FOR VEHICLE SPEED

-- RELATED ART --

ADJUSTABLE SPOILER FOR VEHICLE AND METHOD FOR CONTROLLING THE SAME

CROSS-REFERENCE TO RELATED APPLICATION

This application claims under 35 U.S.C. §119(a) the benefit of priority to Korean Patent Application No. 10-2014-0153634 filed on Nov. 6, 2014, the entire content of which is incorporated herein by reference.

TECHNICAL FIELD

The present disclosure relates to an adjustable spoiler for a vehicle and a method for controlling the same. More particularly, the present disclosure relates to an adjustable spoiler mounted on a vehicle body and capable of improving stability of a vehicle by changing an angle depending on a vehicle speed and a method for controlling the same.

BACKGROUND

An automotive spoiler attached to a vehicle prevents the vehicle from aerodynamic lift and drag due to wind pressure or air pressure in a specific driving situation of the vehicle such as high-speed running or cornering, and improves fuel efficiency.

When the vehicle is in motion, it undergoes various types of resistance. For example, there is air resistance acting in an opposite direction on the vehicle running forward under an influence of aerodynamic flow around the vehicle.

In general, the air resistance is caused by a pressure difference due to air hitting the front of the vehicle. When the vehicle is lifted by a vortex of air at a rear part of the vehicle, a contact force between tires and the ground decreases, and thus, the vehicle cannot increase the speed and becomes unstable.

In order to prevent such lifting, the spoiler changes air flow by spoiling vortexes at a rear side of the vehicle by pressing the rear side of the vehicle.

An existing automotive spoiler has a wing fixed at a predetermined angle, and thus the spoiler cannot effectively manage airflow changes due to a speed change of the vehicle and has a limit in ensuring running stability of the vehicle. To solve this problem, a spoiler (adjustable spoiler) that can automatically adjust an angle has been recently proposed.

Referring to FIGS. 5A and 5B, an existing adjustable spoiler has an angle (positions) controlled in accordance with a vehicle speed. The spoiler according to the related art is operated when the speed is a predetermined speed or more but not operated when the speed is below the predetermined speed. The spoiler is controlled in a step-by-step mode to change a position of the spoiler step by step in accordance with the vehicle speed.

However, the existing adjustable spoiler as described above may be designed without considering an actual wind pressure applied to the spoiler while a vehicle is in motion, and a position of such a spoiler is fixed within a predetermined speed range. Thus, it is difficult to control the position of the existing adjustable spoiler against large drag and lift. Further, a specific control logic for controlling the position of the spoiler is required to control the drag and lift simultaneously, which have conflictive aerodynamic properties, and thereby design becomes complicated The above information disclosed in this Background section is only for enhancement of understanding of the background of the invention, and therefore, it may include information that does not form the prior art that is already known in this country to a person of ordinary skill in the art.

SUMMARY OF THE DISCLOSURE

The present disclosure has been made in an effort to solve the above-described problems associated with prior art.

An aspect of the present inventive concept provides an automotive adjustable spoiler that actively controls a position of the spoiler in real time by sensing a static pressure on a surface of the spoiler, using a pressure sensor disposed on a top of the spoiler to generate a current in response to the pressure.

According to an exemplary embodiment of the present inventive concept, an adjustable spoiler for a vehicle includes a pressure sensor sensing a pressure applied to an upper side of a spoiler and generating a current signal in proportion to the pressure and an electronic control unit (ECU) configured to control an angle of the spoiler according to the current signal from the pressure sensor. The spoiler is mounted on the upper side of a vehicle body.

The pressure sensor may include a plurality of piezoelectric elements arranged on the upper side of the adjustable spoiler. Each piezoelectric element may generate a current in proportion to the pressure while the vehicle runs.

When the current signal is input from the pressure sensor, the ECU may control the angle of the adjustable spoiler by operating an actuator which adjusts the angle of the adjustable spoiler according to the current signal.

When the current signal is input from the pressure sensor, the ECU may compare a value of the current signal with a standard lift value in real time. When the current signal value is greater than the standard lift value, the ECU may increase the angle of the spoiler. When the current signal value is smaller than the standard lift value, the ECU may decrease the angle of the spoiler.

According to another exemplary embodiment of the present inventive concept, a method for controlling an adjustable spoiler for a vehicle comprises sensing a pressure applied on an upper side of the adjustable spoiler and generating a current signal in proportion to the pressure by a pressure sensor. The current signal is compared with a standard lift value and an angle of the adjustable spoiler is adjusted according to the current signal by an ECU.

The adjustable spoiler for a vehicle according to the present disclosure has following advantages.

1. It is possible to continuously control an angle of a spoiler in real time while a vehicle runs.
2. It is possible to actively control a position of the spoiler in proportion to wind pressure that is actually applied while the vehicle is running.
3. It is possible to simultaneously control drag and lift which have conflictive aerodynamic properties.
4. It is possible to provide a simple control process capable of optimally controlling the position of the spoiler by controlling in real time currents generated by piezoelectric elements.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (for example, fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
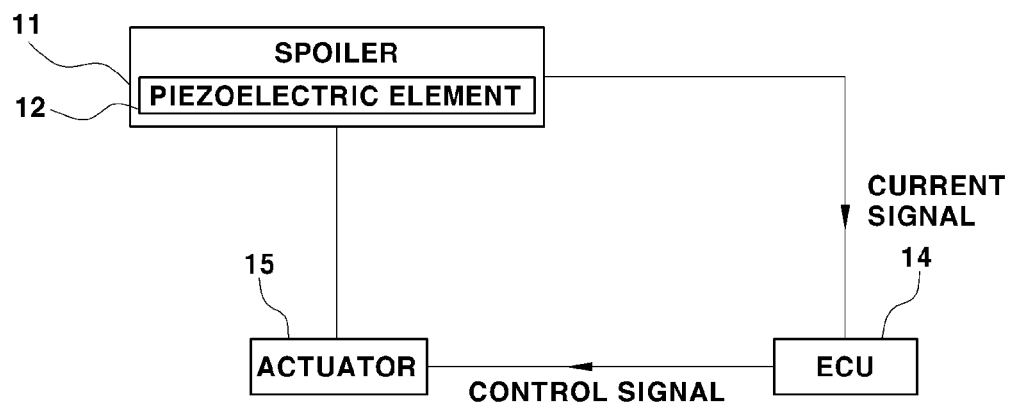
FIG. 1 is a diagram illustrating a configuration of an adjustable spoiler for a vehicle according to an embodiment of the present inventive concept.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the invention to those exemplary embodiments. On the contrary, the inventive concept is intended to cover not only the exemplary embodiments, but also various alternatives, modifications, equivalents, and other embodiments, which may be included within the spirit and scope of the disclosure as defined by the appended claims.

Hereinafter, the present disclosure will be described for those skilled in the art to easily achieve it.

The present disclosure relates to a surface static pressure-sensible adjustable spoiler that is mounted, for example, on a top surface of a trunk of a vehicle in order to secure running stability of the vehicle by controlling a position (angle) of a spoiler in real time in consideration of an actual wind pressure on the top surface of the spoiler while the vehicle is running.

As known in the art, the spoiler is mounted on a vehicle body (for example, the top surface of the trunk) such that its angle can be changed by a link mechanism, and the like, and can be changed and adjusted by an actuator which operates by an electronic control unit (ECU) in a vehicle.

As illustrated in FIG. 1, an adjustable spoiler for a vehicle according to the present disclosure includes a spoiler 11 having a pressure sensor 12 mounted thereon, an ECU 14 configured to output a control signal for controlling a position of the spoiler 11 based on a current signal from the pressure sensor 12, and an actuator 15 changing the position (angle) of the spoiler 11 in response to the control signal from the ECU 14.

The spoiler 11 includes the pressure sensor 12 on a top side thereof. The spoiler 11 generates downforce using air flowing around the vehicle in motion and presses down a vehicle body when the vehicle is running at a high-speed with the downforce, thereby allowing the vehicle to be more stable.

The pressure sensor 12 generates a current in response to pressure (wind pressure) applied to the side top of the spoiler 11 when the vehicle is running, that is, generates the current when mechanical stress is generated on the top side of the spoiler 11, and is composed of a plurality of piezoelectric elements 13.

The piezoelectric element 13, as known in the art, generates a current when it is pressed and generates the current in proportion to applied pressure, and particularly, a ceramic-based piezoelectric element, which is small and has high sensitivity, response, and thermal resistance, may be used herein.

Figure 2:
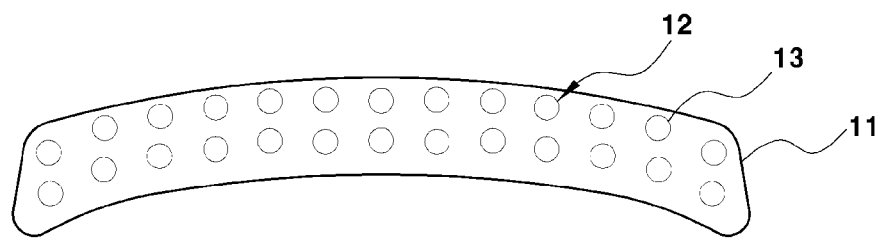
FIG. 2 is a plan view showing a piezoelectric element array on an upper side of an adjustable spoiler according to an embodiment of the present inventive concept.

Referring to FIG. 2, the pressure sensor 12 is an array of a plurality of piezoelectric elements 13 generating the current signal in proportion to the pressure applied to the top side of the spoiler 11 and composed of the plurality of piezoelectric elements 13 arranged with a predetermined or regular interval on the top side of the spoiler 11.

Though not illustrated in the drawings, the actuator 15, which includes a mechanical link mechanism connected to the spoiler 11, controls the angle (position) of the spoiler 11 by generating a force in response to the control signal from the ECU 14.

The pressure (wind pressure) applied to the top of the spoiler 11 increases with an increase of a vehicle speed and the current generated by the pressure sensor 12 in proportion to the pressure applied to the top of the spoiler 11 is used as an input signal for the ECU 14, thereby actively controlling the link mechanism of the actuator 15 in real time.

The actuator 15 according to the present disclosure for controlling the angle of the automotive spoiler is well known in the art, so it will not described in detail herein.

The ECU 14 controls the angle of the spoiler 11 by controlling the operation of the actuator 15 in response to the current signal from the pressure sensor 12 and actively controls the position of the spoiler 11 in real time by comparing the current signal with a standard lift value according to a current vehicle speed.

The standard lift value, which is a lift value according to the current vehicle speeds, is provided in a table constructed in advance by lift tests according to the vehicle speed. The table is stored in the ECU 14 to provide the standard lift value.

As known in the art, as a vehicle increases speed, lift due to airflow also increases.

Figure 3:
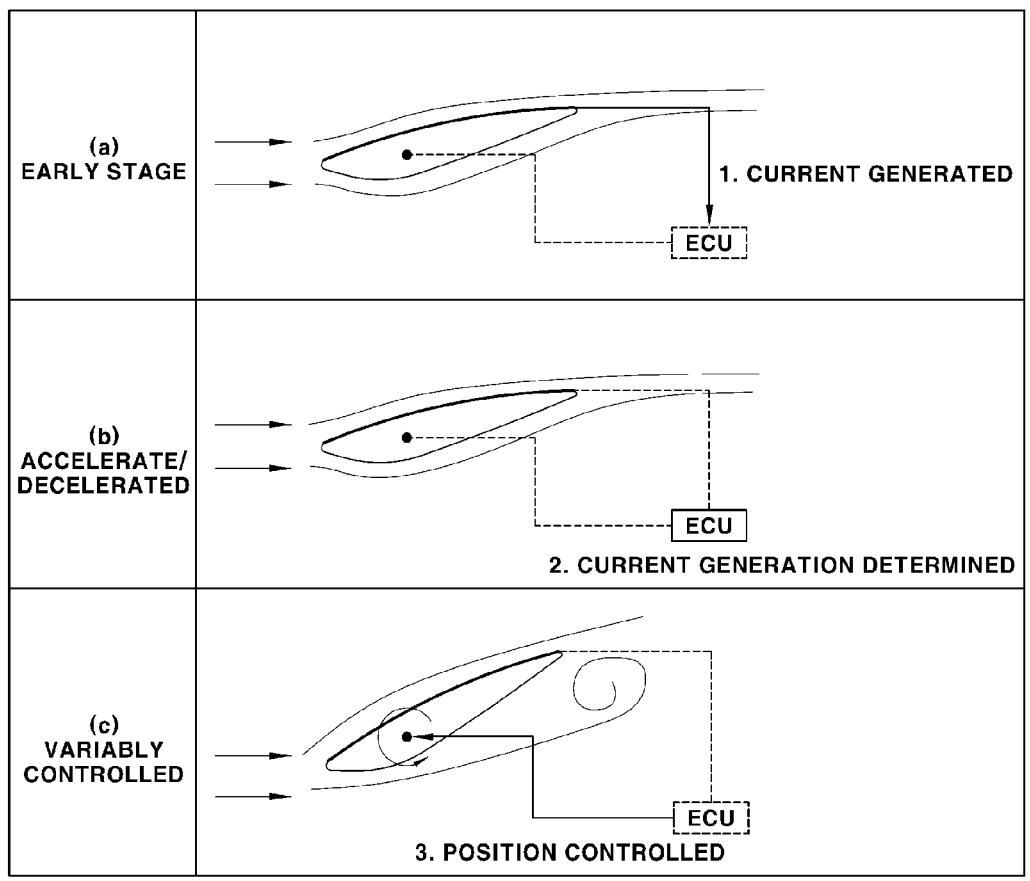
FIG. 3 is a schematic diagram illustrating an operation principle of an adjustable spoiler according to an embodiment of the present inventive concept
Figure 4:
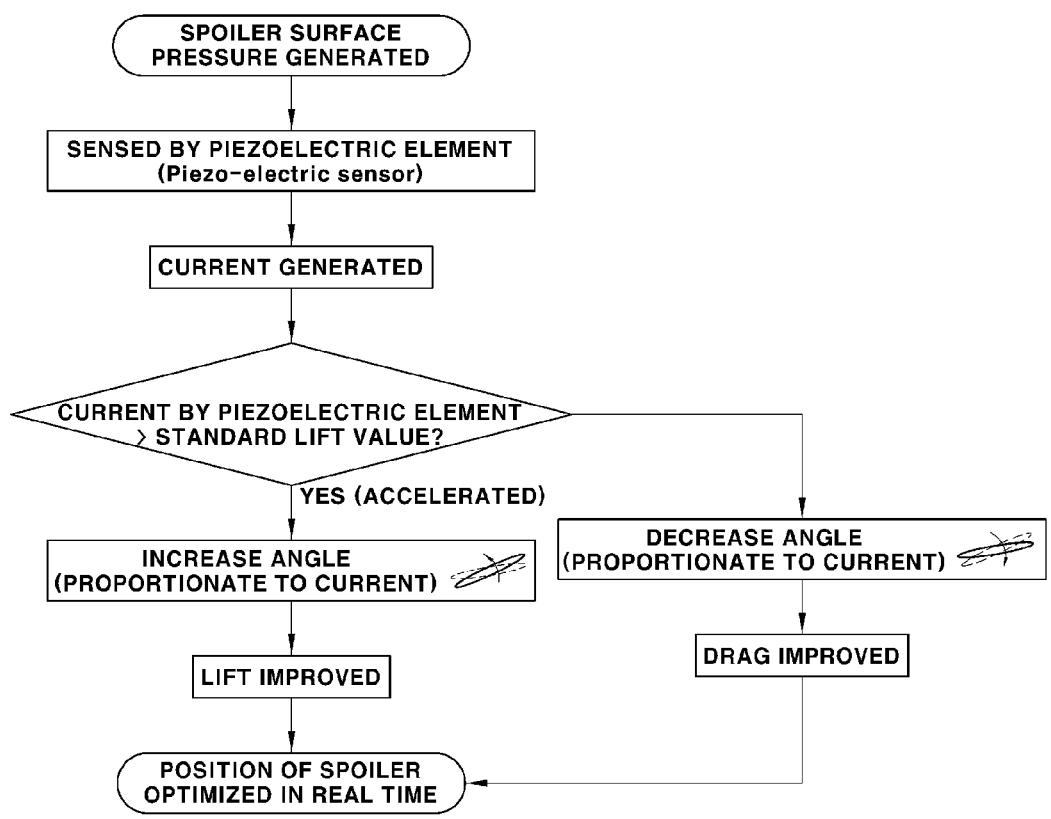
FIG. 4 is a flowchart diagram illustrating an operation process of an adjustable spoiler for a vehicle according to an embodiment of the present inventive concept.
Figure 5A:
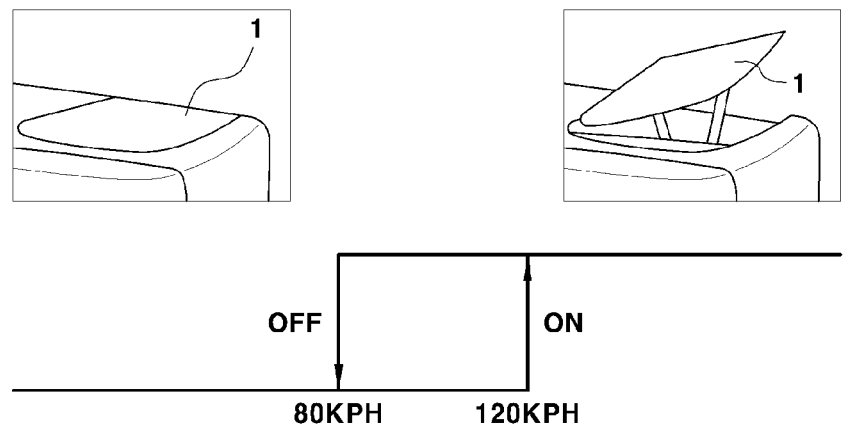
FIGS. 5A and 5B are schematic diagrams illustrating an operation of an adjustable spoiler of the related art.
Figure 5B:
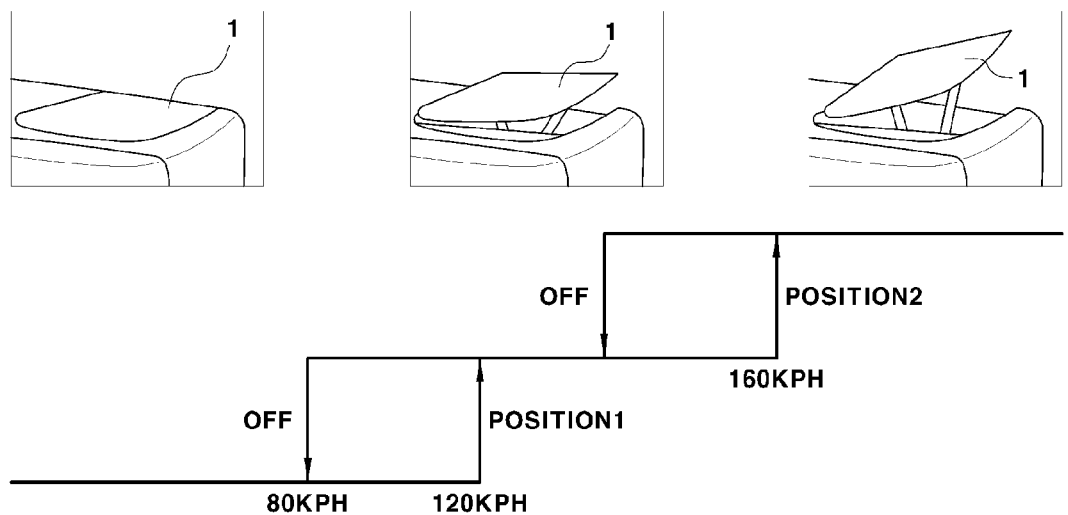

Referring to FIGS. 3 and 4, when the vehicle is running, the pressure sensor 12 generates the current signal in proportion to the pressure applied to the top side of the spoiler 11, and the ECU 14 receives and compares the current signal with the standard lift value.

As the vehicle speed increases, the pressure applied to the top side of the spoiler 11 increases, and the current signal generated by the pressure sensor 12 increase accordingly.

The ECU 14 compares the current signal inputted in real time with the standard lift value in real time according to the current vehicle speed. When a current signal value is higher the standard lift value, the ECU 14 determines that the vehicle is being accelerated and increases the angle of the spoiler 11 in proportion to the current signal. Further, when the current signal value is smaller than the standard lift value, the ECU 14 determines that the vehicle is being decelerated and decreases the angle of the spoiler 11 in proportion to the current signal.

The ECU 14 converts the current signals from the pressure sensor 12 into the unit of force to have the same unit as the lift, and then compares them with the standard lift values.

The ECU 14 can actively and continuously control the position of the spoiler 11 in real time to the optimum level on the basis of the current signal from the pressure sensor 12. Accordingly, when the ECU 14 determines that the vehicle is being accelerated, the lift on the vehicle can improved by increasing the angle of the spoiler 11. When the ECU 14 determines that the vehicle is being decelerated, the drag on the vehicle can be improved by decreasing the angle of the spoiler 11.

As described above, the adjustable spoiler according to the present disclosure can secure stable running performance and aerodynamic performance of a vehicle, unlike a position-fixing control type using a vehicle speed according to the related art, by continuously changing the spoiler to optimum positions depending on the pressure applied in real time to the top side of the spoiler.

The inventive concept has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A adjustable spoiler for a vehicle, comprising:
    a pressure sensor sensing a pressure applied to an upper side of the adjustable spoiler and generating a current signal in proportion to the pressure; and
    an electronic control unit (ECU) configured to control an angle of the adjustable spoiler according to the current signal,
    wherein the adjustable spoiler is mounted on the upper side of a vehicle body.

2. The adjustable spoiler of claim 1, wherein the pressure sensor includes a plurality of piezoelectric elements arranged on the upper side of the adjustable spoiler, and each of the plurality of piezoelectric elements generates a current in proportion to the pressure while the vehicle runs.

3. The adjustable spoiler of claim 1, wherein when the current signal is input from the pressure sensor, the ECU controls the angle of the adjustable spoiler by operating an actuator which adjusts the angle of the adjustable spoiler according to the current signal.

4. The adjustable spoiler of claim 1, wherein when the current signal is input from the pressure sensor, the ECU compares a value of the current signal with a standard lift value in real time, and when the current signal value is greater than the standard lift value, the ECU increases the angle of the adjustable spoiler.

5. The adjustable spoiler of claim 1, wherein when the current signal is input from the pressure sensor, the ECU compares a value of the current signal with a standard lift value in real time, and when the current signal value is smaller than the standard lift value, the ECU decreases the angle of the adjustable spoiler.

6. A method for controlling an adjustable spoiler for a vehicle, comprising:
    sensing, by a pressure sensor, a pressure applied on an upper side of the adjustable spoiler and generating a current signal in proportion to the pressure;
    comparing, by an ECU, the current signal with a standard lift value; and
    adjusting, by the ECU, an angle of the adjustable spoiler according to the current signal.

7. The method of claim 6, further comprising, after the step of comparing:
    increasing the angle when the current signal has a value greater than the standard lift value.

8. The method of claim 6, further comprising:
    decreasing the angle when the current signal has a value smaller than the standard lift value.

* * * * *